Nov. 21, 1933.   C. A. RUESENBERG   1,936,032
FRICTION CLUTCH
Filed Jan. 25, 1932   3 Sheets-Sheet 1

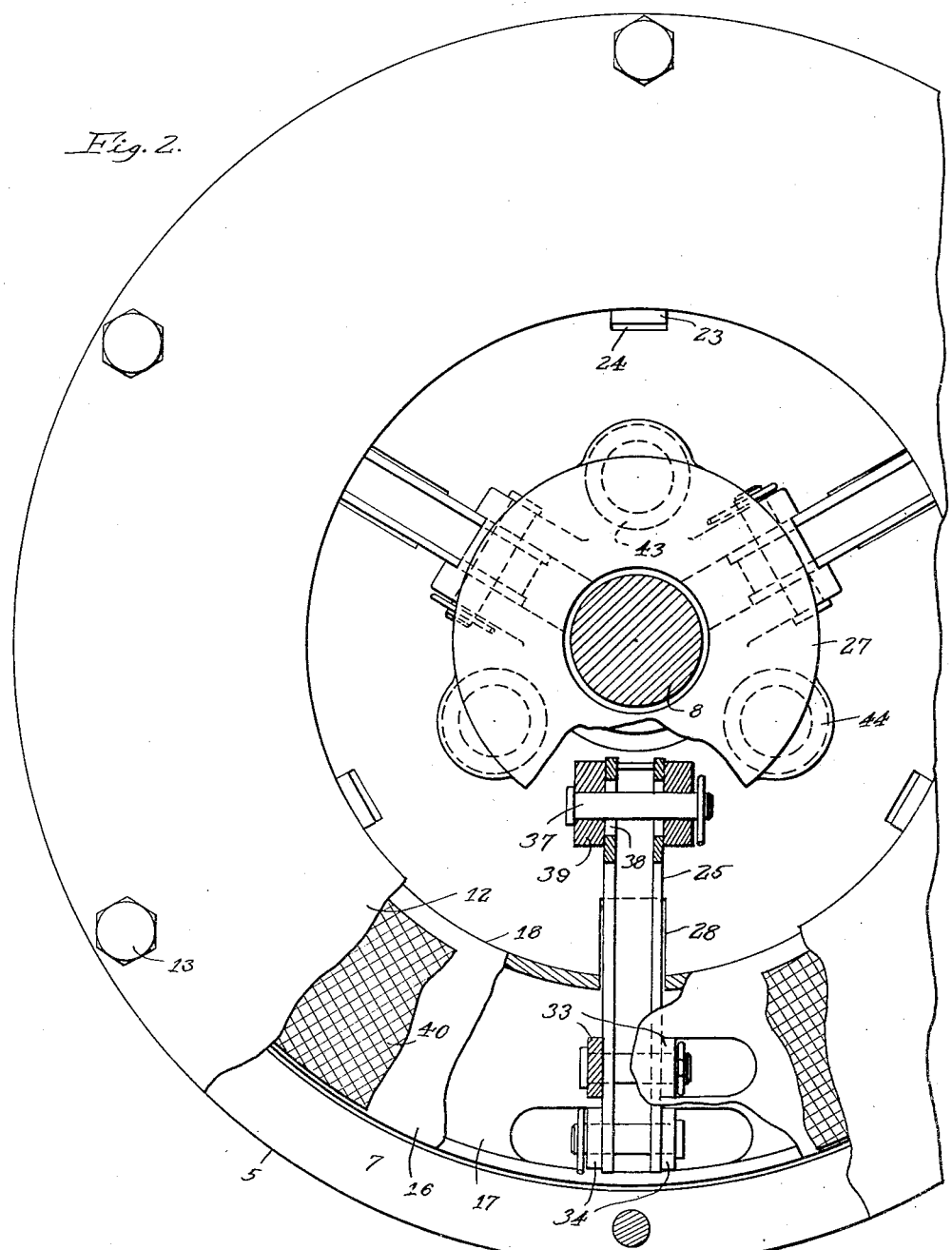

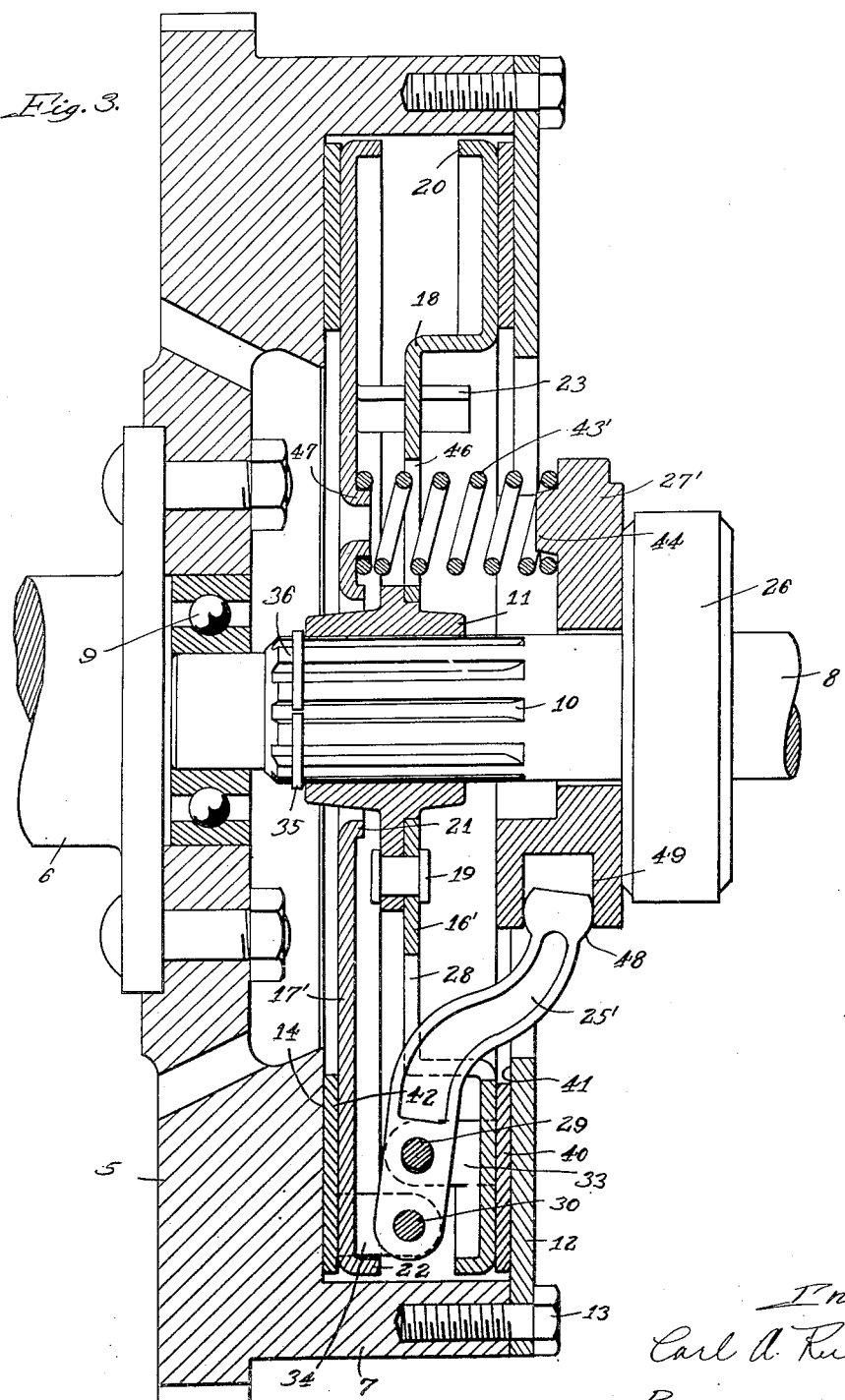

Patented Nov. 21, 1933

1,936,032

UNITED STATES PATENT OFFICE 1,936,032

FRICTION CLUTCH

Carl A. Ruesenberg, Rockford, Ill., assignor to Rockford Drilling Machine Co., Rockford, Ill., a corporation of Illinois Application January 25, 1932. Serial No. 588,560

8 Claims. (Cl. 192—70)

This invention relates to friction clutches suitable for general use, although the present design is especially adapted for use on motor vehicles.

The invention is principally concerned with improvements on the clutch disclosed in my copending application, Serial No. 444,159, filed April 14, 1930, wherein the pressure plate and the usual arrangement of springs that went with it are eliminated, and in place of the ordinary disc, a special disc made up of two sections is provided, namely, a ring section having a facing for engagement with the flywheel, and a plate section having a facing for engagement with the back plate. Then, instead of having the usual release levers on a back plate and cooperating with the pressure plate, release levers are provided pivotally supported near their outer ends on the plate section and pivotally supported at the outer ends on the ring section, and an abutment is provided on the driven shaft for the clutch disc center, so that initial movement of the levers causes the plate section to be disengaged, and further movement, in which the clutch disc center engages the abutment, causes the ring section to be disengaged. In the clutch disclosed in the other application, the two sections are spread apart normally under the action of springs disposed therebetween, but, in accordance with the present invention, I provide a concentration ring to which the inner ends of all of the release levers are pivotally connected for actuation, and provide springs acting directly against the concentration ring, whereby to serve normally to spread the sections of the clutch disc apart with increased force by reason of the multiplication secured with the levers. With this design, a small number of comparatively light springs accomplishes the same result as a large number of springs, and the construction is, moreover, made simpler and cheaper, as well as easier to assemble.

The invention is illustrated in the accompanying drawings, in which—

Fig. 2 is a rear view showing certain parts broken away for better illustration, and Fig. 3 is a section similar to Figure 1, but showing a modified or alternative construction.

Similar reference numerals are applied to corresponding parts in the drawings.

Figure 1:
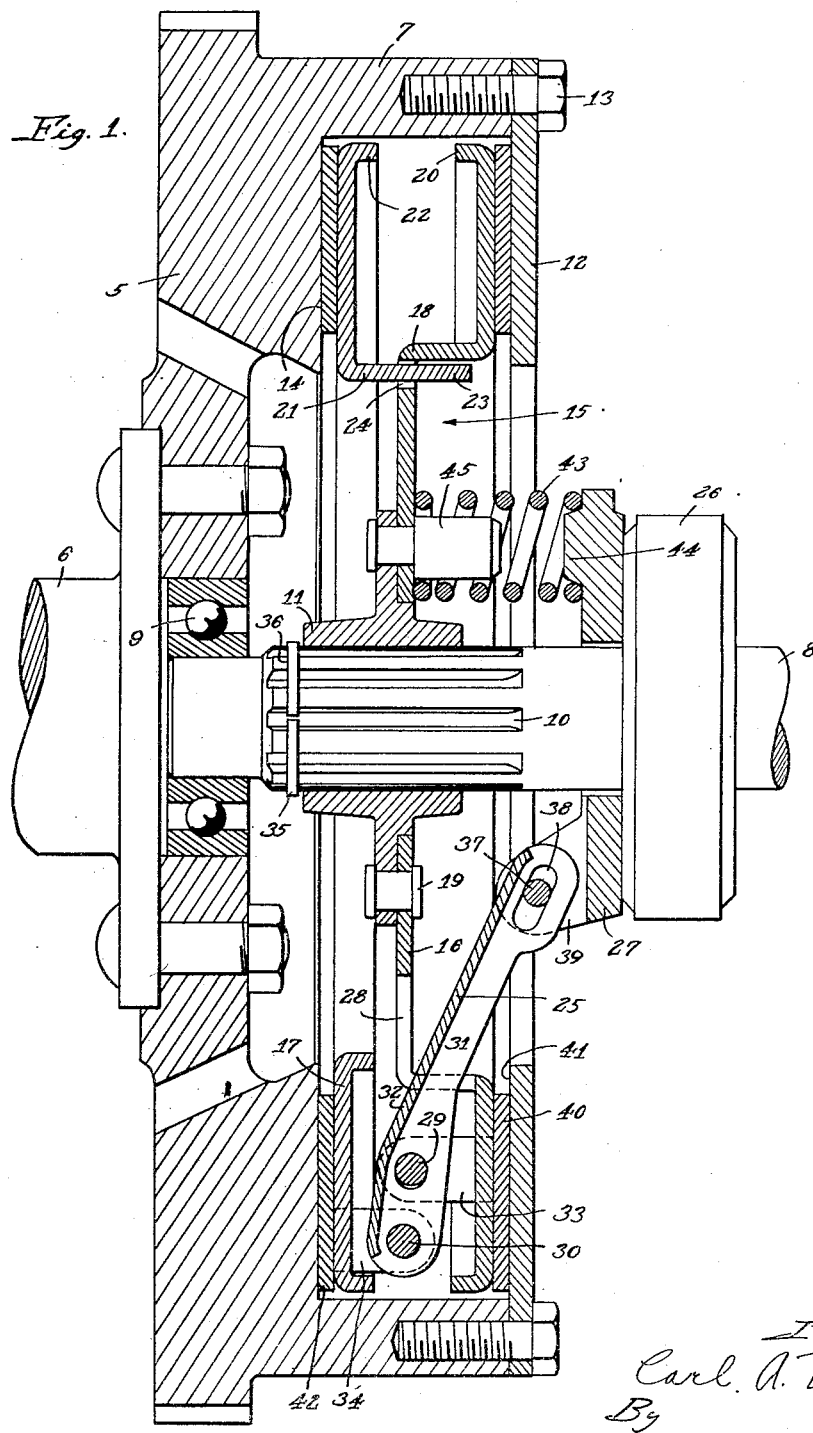
Figure 1 is a section through a flywheel showing the clutch of my invention assembled thereon.

Referring to Figs. 1 and 2, the reference numeral 5 is applied to the flywheel mounted in the usual way on the rear end of the engine crank shaft 6 and constituting the housing for and driving element of the clutch housed within the integral annular rim 7 projecting rearwardly from the flywheel, as shown. A shaft 8, constituting the driven element, extends rearwardly from the clutch into the gear box of the transmission, there being ordinarily a housing about the flywheel and clutch assembly at the front end of the gear box, as is well known, and there being also a plate thereon which, when removed, affords access to the clutch for purposes of inspection or adjustment. It is common practice to have the front end of the shaft 8 received in a bearing 9 in the center of the flywheel and to have the shaft splined, as at 10, behind this bearing to take the hub or center 11 of the clutch disc. It is also common practice to fasten the back plate 12 to the rim of the flywheel by means of cap screws 13. In the ordinary clutch the back face 14 of the flywheel is ground smooth and square with the axis for drive purposes and the same is true of the front face of the pressure plate which, however, in accordance with my invention, is eliminated in the present clutch, its place being taken in part by a special clutch disc, indicated generally by the reference numeral 15.

The clutch disc 15 is made of two sections, a circular plate 16 and a circular ring 17, the former being dished centrally, as indicated at 18, and secured to the center 11 as by rivets 19. The plate 16 and ring 17 are stamped from sheet metal for lightness and cheapness, and as will soon appear, to avoid machining cost. The plate 16 is naturally stiffened considerably by the dishing, and it is given additional reinforcement by forming a peripheral flange 20 thereon. Internal and external peripheral flanges are formed on the ring 17, as indicated at 21 and 22, for a similar purpose. A plurality of lugs 23 project from the internal flange 21 of the ring 17 through radial slots 24 provided in the plate 16 and have a close working fit therein, so as to permit relative axial movement between the plate and ring as required for engagement and disengagement of the clutch while holding the plate and ring in true concentric relation. The lugs 23 also assume the drive and keep the ring 17 turning with the plate 16 as a unit. Three of these lugs are provided, as appears in Fig. 2, preferably in equally circumferentially spaced relation. Release levers 25, arranged to be operated in the usual way by a throw-out collar 26, extend substantially radially from an intermediate pressure and concentration ring 27, disposed in front of the collar, through slots 28 in the plate 16, for pivotal connection with the plate at 29 near the outer ends of the levers, and pivotal connection with the ring 17 at 30 at the outer ends of said levers. The levers 25, of which there are three in equally spaced relation as shown in Fig. 2, are each of stamped sheet metal construction, channel shaped in cross-section so as to provide spaced parallel flanges 31 joined by a transverse web 32. This makes for lightness and strength, and the levers are broad enough at their pivots 29 and 30 to provide good bearing support therefor on the clutch disc. The pivot 29, in each case, is provided by a pin passed through registering holes in a pair of parallel lugs 33 struck inwardly from the plate 16, the lever being disposed between the lugs with their flanges 31 in abutment with the lugs. The pivot 30, in each case, is similarly provided by a pin passed through registering holes in a pair of parallel lugs 34 struck inwardly from the ring 17 and through registering holes in the flanges 31. The holes in the levers 25 for the pivot pins 29 are slightly elongated, as appears in Figure 1, for an obvious reason. Suitable means are provided for holding the pins 29 and 30 in place, as indicated in Fig. 2. It should now be observed that a split ring 35 is seated in an annular groove 36 provided in the shaft 8 in front of the clutch disc center 11, and that the levers 25 are pivotally connected to the ring 27 by cross pins 37 entered through elongated slots 38 provided in the inner ends of the levers in the flanges 31 thereof, and mounted in forked projections 39 provided on the ring 27. The pins 37, like the pins 29 and 30, are held in place by suitable means indicated in Fig. 2. It should also be observed that the plate 16 has a pad or facing 40 mounted on the marginal portion thereof for frictional engagement with the drive surface 41 provided on the inside of the back plate 12, and that the ring 17 is similarly provided with a pad or facing 42 for frictional engagement with the drive surface 14 on the flywheel. Now, assuming that spring means, such as will be presently described, is provided tending normally to urge the plate 16 and ring 17 apart to cause frictional engagement of the pad 40 with the surface 41 and pad 42 with surface 14, as illustrated in Figure 1, it will be clear that the forward movement of the throw-out collar 26 will serve to disengage the clutch. The initial movement of the levers 25 by means of the ring 27 and collar 26 results in the disengagement of the plate 16, the plate, together with its center 11, being moved forwardly until the center 11 comes into engagement with the ring 35, which serves as a stop or abutment for limiting forward movement of the parts referred to. Thereafter, the continued movement of the levers 25 results in the backing away of the ring 17 from the flywheel, so that complete disengagement of the clutch is secured. In other words, the clutch disc is contracted axially out of frictional driving engagement with the drive surfaces 14 and 41 provided on the back of the flywheel 5 and on the inside of the back plate 12, respectively. The disengagement is absolutely positive, and the immediate freeing of the disc is accomplished regardless of any tendency for the pads 40 and 42 to stick, as often occurs. Moreover, it will be seen that after the disengagement of the clutch disc, the same is not free to spin as it is in other clutches, where the disc has no connection whatever with the release levers. The disc is subjected to a definite braking effect by reason of the fact that the release levers 25 assembled on the disc are held firmly in engagement with the throw-out collar under the action of the clutch springs, and, of course, there is an appreciable resistance to the turning of the throw-out collar despite the fact that it usually has an anti-friction thrust bearing. Consequently, the clutch disc is almost immediately slowed down after disengagement, without the use of a special clutch brake. When the clutch is to be engaged, the clutch pedal is released and the throw-out collar 26 permitted to back away in the usual way, thus permitting the pad 42 to come into engagement with the surface 14, and the pad 40 thereafter to come into engagement with the surface 41. The clutch is bound to have a very smooth action because of the gradual engagement and disengagement resulting from the engagement of one section of the disc before the other and disengagement thereof after the other. This obviously avoids the objectionable grabbing so common in friction clutches, and tends toward longer life of the clutch because the pads are not subjected to such a destructive action.

In the earlier application, I disclosed the use of nine coiled compression springs disposed in circumferentially spaced relation directly between the marginal portion of the plate 16 and the ring 17, that is, directly between the pads or facings 40 and 42. The use of so many springs meant not only additional material cost, but additional labor cost as well in the matter of assembling. It is a special aim of the present invention to simplify the clutch in that regard, and that is done by providing three coiled compression springs 43 disposed in equally circumferentially spaced relation directly around the shaft 8 and tending normally to urge the ring 27 and collar 26 to the rear, the springs being disposed with the rear ends fitting over small circular bosses 44 provided on the ring 27, and with their front ends fitting over studs 45 projecting rearwardly from the plate 16. Each of the levers 25 is, therefore, normally urged outwardly with respect to the clutch disc at the inner ends thereof under the action of the springs, and it is apparent that the force of the springs is multiplied through the levers to urge the plates 16 and 17 into firm engagement with the friction drive surfaces. The levers 25 have approximately a 4:1 mechanical advantage, as readily appears from inspection of Figure 1, so that three springs, lighter than the ones used in the clutch disclosed in the other application, serve to force the plate and ring sections of the clutch disc apart with approximately the same force as the nine springs disclosed in the other application. The saving in material and assembling costs secured as a result of this improvement is believed to be self-evident.

In Fig. 3, a slightly modified construction is disclosed, in which springs 43' instead of being disposed between the plate 16' and the ring 27', are disposed between the rings 17' and 27', the plate 16' being provided with holes 46 through which the springs project, and the ring 17' being increased in width sufficiently to permit utilizing the inner margin thereof as an abutment for the springs, the same being provided with circular bosses 47 suitably punched therefrom to fit in the ends of the springs to definitely locate and hold the same in position, in much the same way as the bosses 44 cooperate with the other ends of the springs. It is apparent that the same effect, so far as spring pressure multiplication is concerned, is secured with this construction as with that previously described. The release levers 25' in this design are shown as forged instead of being stamped from sheet metal, and have rounded inner ends 48 slidably received in radial guides 49 provided therefor in the ring 27'. The operation of this clutch is substantially the same as that of the other.

It is believed the foregoing description conveys a good understanding of the objects and advantages of this invention. The following claims have been drawn to cover all legitimate modifications and adaptations.

I claim:

1. In a friction clutch, the combination with a housing element, a shaft element coaxially disposed with respect to the housing element, the one element being the driving element and the other the driven element, the housing having a friction drive surface on the back face thereof, and a back plate on the housing having a friction drive surface on the inside thereof, of a clutch disc mounted on the shaft between the two drive surfaces, said disc comprising two sections at least one of which has a center hub mounted on the shaft, the sections being arranged for engagement with the two drive surfaces when spread apart, levers disposed with their outer ends between the clutch disc sections, pivotally connected with the one section near the outer end and pivotally connected with the other at the outer end, and having the inner ends thereof disposed adjacent the shaft, spring means adjacent the shaft and acting between one of the disc sections and the inner ends of said levers tending normally to move the same in one direction, the force of said spring means being multiplied through said levers whereby normally to urge the clutch disc sections in a certain direction, and manually operable means also cooperating with the inner ends of said levers to move the same in the other direction.

2. In a friction clutch, the combination with a housing element, a shaft element coaxially disposed with respect to the housing element, the one element being the driving element and the other the driven element, the housing having a friction drive surface on the back face thereof, and a back plate on the housing having a friction drive surface on the inside thereof, of a clutch disc mounted on the shaft between the two drive surfaces, said disc comprising two sections at least one of which has a center hub mounted on the shaft, the sections being arranged for engagement with the two drive surfaces when spread apart, levers disposed with their outer ends between the clutch disc sections, pivotally connected with the one section near the outer end and pivotally connected with the other at the outer end, and extending inwardly toward the shaft, compression spring means acting between one of the disc sections and the inner ends of said levers yieldingly to urge the disc sections apart and manually operable means for moving the levers in the opposite direction.

3. In a friction clutch of the character described, a clutch disc comprising two sections at least one of which has a center hub for mounting the clutch disc on a shaft, the sections being arranged for engagement with a pair of opposed drive surfaces when spread apart, levers disposed with their outer ends between the clutch disc sections, pivotally connected with the one section near the outer end and pivotally connected with the other at the outer end, and extending inwardly toward the center of the disc, and spring means disposed between one of said sections and the inner ends of said levers and tending normally to move the levers in one direction, said levers being arranged to be moved manually in the opposite direction.

4. In a friction clutch of the character described, a clutch disc comprising two sections at least one of which has a center hub for mounting the clutch disc on a shaft, the sections being arranged for engagement with a pair of opposed drive surfaces when spread apart, levers disposed with their outer ends between the clutch disc sections, pivotally connected with the one section near the outer end and pivotally connected with the other at the outer end, and extending inwardly toward the center of the disc, and compression spring means disposed between one of said sections and the inner ends of said levers tending normally to move the levers in one direction so as to spread the sections apart for engagement of the clutch, said levers being arranged to be moved manually in the opposite direction.

5. In a friction clutch of the character described, a clutch disc comprising front and rear sections, at least one of which has a center hub for mounting the clutch disc on a shaft, the sections being arranged for engagement with a pair of opposed drive surfaces when spread apart, levers disposed with their outer ends between the disc sections but having their inner ends extended rearwardly through openings provided therefor in the rear section, said levers being pivotally connected with the one section near the outer end and pivotally connected with the other section at the outer end, and spring means extending through openings provided in the rear section and acting between the front section and the inner ends of said levers tending normally to move the levers in one direction, said levers being arranged to be moved manually in the opposite direction.

6. In a friction clutch of the character described, a clutch disc comprising front and rear sections, at least one of which has a center hub for mounting the clutch disc on a shaft, the sections being arranged for engagement with a pair of opposed drive surfaces when spread apart, levers disposed with their outer ends between the disc sections but having their inner ends extended rearwardly through openings provided therefor in the rear section, said levers being pivotally connected with the one section near the outer end and pivotally connected with the other section at the outer end, and coiled compression springs extending through openings provided in the rear section and having their front ends bearing against the front section and their rear ends cooperating with the inner ends of said levers tending normally to move the levers in one direction to spread the clutch disc sections apart, said levers being arranged to be moved manually in the opposite direction.

7. In a friction clutch of the character described, a clutch disc comprising front and rear sections, at least one of which has a center hub for mounting the clutch disc on a shaft, the rear section being dished forwardly centrally thereof, said sections being arranged for engagement with a pair of opposed drive surfaces when spread apart, levers disposed with their outer ends between said sections and pivotally connected with the one section near the outer end and pivotally connected with the other section at the outer end, the inner ends of said levers projecting through openings provided therefor in the dished portion of the rear section and arranged for manual operation from behind the rear section, and spring means disposed between one of said sections and the inner ends of said levers and tending normally to move the levers in one direction.

8. A friction clutch as set forth in claim 7 including one or more rearwardly projecting lugs provided on the front section and slidably received in openings provided therefor in the rear section, whereby to prevent rotation of one section relative to the other.

CARL A. RUESENBERG.